United States Patent [19]

Boon

[11] 3,829,165

[45] Aug. 13, 1974

[54] ANTI-STOPPAGE APPARATUS AND METHOD FOR AIR CONVEYING SYSTEMS

[75] Inventor: Bruce Theodore Edward Boon, Wayne, N.J.

[73] Assignee: Eastern Cyclone Industries, Inc., Fairfield, N.J.

[22] Filed: Aug. 31, 1972

[21] Appl. No.: 289,368

[52] U.S. Cl. .................................. 302/59, 55/484
[51] Int. Cl. ............................................. B65g 53/40
[58] Field of Search ............. 55/318, 385, 482, 484; 302/28, 59

[56] References Cited
UNITED STATES PATENTS

| | | | |
|---|---|---|---|
| 559,237 | 4/1896 | Washburne | 302/59 X |
| 560,914 | 5/1896 | Murray | 302/59 |
| 985,930 | 3/1911 | Phelps | 302/59 X |
| 1,037,223 | 9/1912 | Ellenburg et al. | 302/59 X |
| 1,179,291 | 4/1916 | Davison | 302/59 X |
| 1,339,240 | 5/1920 | Travis | 302/59 |
| 1,597,438 | 8/1926 | Ennis | 302/2 R X |
| 2,799,355 | 7/1957 | Easton | 55/340 X |
| 3,310,349 | 3/1967 | Tilley et al. | 302/59 |
| 3,580,644 | 5/1971 | Ballard | 302/59 |
| 3,580,645 | 5/1971 | Hagenah | 302/59 |

Primary Examiner—Evon C. Blunk
Assistant Examiner—W. Scott Carson
Attorney, Agent, or Firm—James M. Heilman; William O. Heilman; Athony J. Casella

[57] ABSTRACT

Anti-stoppage or anti-clogging apparatus and method for pneumatic conveying system wherein the conveyed material is more efficiently and more rapidly separated from the conveying pneumatic stream. A specially designed bypass element or pre-air separation station is positioned upstream and adjacent the separation or collection station. This pre-air separation station functions to reduce the operating vacuum or pressure of the system by releasing or separating at least a portion of the conveying air stream from the material being conveyed prior to the material entering the separation or collection station. The released or separated portion of air by-passes the area of the separation station where the conveyed material is removed from the system.

5 Claims, 3 Drawing Figures

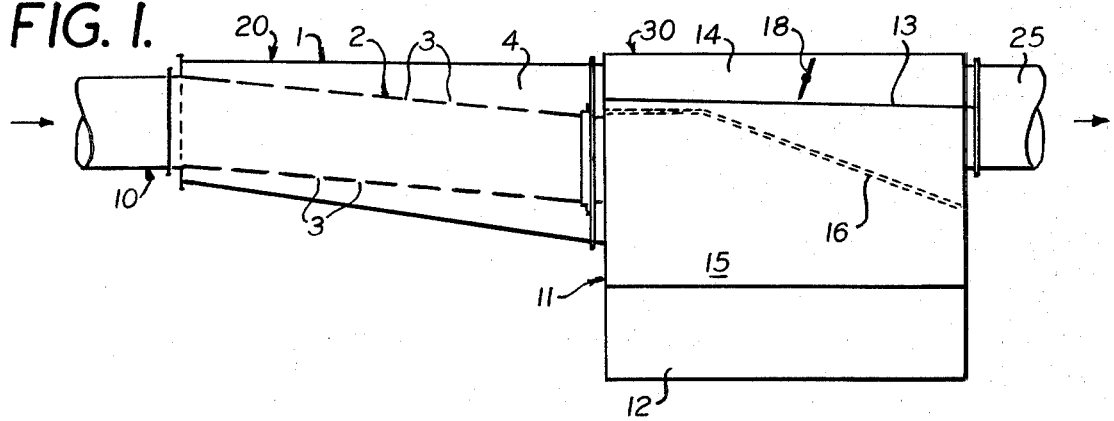

1

ANTI-STOPPAGE APPARATUS AND METHOD FOR AIR CONVEYING SYSTEMS

BACKGROUND OF THE INVENTION AND RELATED APPLICATIONS

The present invention is applicable to all pneumatic conveying systems as for example, those described in Boon U.S. Pat. No. 3,388,260, issued June 11, 1968, entitled "Photo Sensitive Device for Conveying and Counting Fabrics"; U.S. Pat. No. 3,469,931, issued Sept. 30, 1969 entitled "Method for Treating Materials"; U.S. Pat. No. 3,524,681, issued Aug. 18, 1970 entitled "Laundry and Fabric Collector and Method Having a Constant Vacuum"; U.S. Pat. No. 3,606,478, issued Sept. 20, 1971 entitled "Trash and Refuse Depository System" and pending U.S. applications Ser. No. 141,750 and No. 186,693, now U.S. Pat. No. 3,747,986 all of which are incorporated herein by reference.

The present invention is concerned with an apparatus and method relating to a pneumatic conveying system wherein the efficiency of the system is greatly increased; particularly with respect to the separation of the materials being conveyed from the pneumatic conveying stream, such as an air stream. The material being conveyed may be of any type, including very small particles, but this system is particularly useful with the larger or bulkier light weight items, such as laundry, bed linens, fabrics, papers and generally trash or refuse. In accordance with the present invention at least a portion of the conveying air stream is released from the material being conveyed preferably just prior to the material entering the separation station, i.e., where the material is collected for removal from the system.

In pneumatic conveying systems certain problems are encountered at stations for the removal of conveyed material from the system. At these stations the conveyed material is usually separated from the pneumatic stream by perforated elements such as screens or perforated plates which permits the air to flow therethrough and causes the material to fall into receiving hoppers having various arrangements of doors through which the material is removed from the system. However, these perforated elements tend to become clogged generally with lint and light weight materials. As certain holes or perforations become clogged, the velocity and strength of the air streams through the remaining still open or unclogged holes increases proportionally thereby greatly aggravating the problem and necessitating the shutting down of the entire system at periodic intervals for cleaning or clearing the material from blocking the holes.

The present invention greatly reduces this problem and saves money by a unique combination of elements which includes a pneumatic material conveying system secured to a conventional conveying duct carrying materials propelled by air. A pre-selection chamber is housed in an outer casing having an inner perforated container which is a continuation of the conveying duct. The space between the outer casing and the inner container is connected to an exit conduit and the atmosphere. A final separation chamber comprises a storage bin covered on top by a perforated screen, the space above the screen connected to the exit conduit and the atmosphere.

Referring to the figures:

FIG. 1 is a schematic diagram of the system as viewed from one side.

FIG. 2 is a schematic cross sectional view, to a larger scale, taken downstream and generally along a section line which intersects the pre-selection chamber perpendicular to the air flow direction.

FIG. 3 is a schematic diagram, similar to FIG. 1 but showing an alternate arrangement wherein all the air is separated from the materials in the pre-selection chamber.

Referring specifically to FIG. 1: In a conventional pneumatic system, materials which are in a conveying air stream are preferably propelled by fans upstream and enter the present apparatus through a conventional conveying duct 10. The apparatus of this invention comprises in combination a pre-separation chamber 20 and a materials separation chamber 30. The pre-separation chamber 20 comprises an outer solid or unperforated casing or shell 1 preferably circular, and an inner shell 2 also preferably circular and having perforations 3. The diameter of outer casing 1 preferably increases in the direction of flow, while the diameter of inner perforated shell 2 preferably remains constant. A preferred geometrical configuration is to form outer casing 1 in a funnel or somewhat frusto-conical shape and to have inner shell 2 concentrically disposed therein. Although it is preferred that the cross sectional area of the inner perforated shell should be constant in the direction of flow, certain operating conditions might dictate that the cross sectional area of the inner perforated shell increases.

It is preferred to have pre-separation chamber 20 obliquely attached to materials separation chamber 30 so that their respective upper surfaces prevent substantially a horizontal line, or be substantially in the same horizontal plane.

The respective dimensions may vary appreciably as a function of operating conditions such as type of material being conveyed, quantity of material, distances between collecting points, number of ducts entering and leaving the separation chamber, etc., certain satisfactory measurements are, for example: diameter of conduit 10 from 2" to 48", such as about 16". Length of pre-separation chamber 20 from 4' to 25', such as about 6'. Diameter of outer casing 1 at inlet end from about 4" to 60" such as about 20". Diameter of outer casing 1 at outlet end from about 6" to 80" such as about 30". Diameter of inner perforated shell 2 from about 2" to 48" such as about 16". The perforations 3 are, for example, 3/10" on 6" centers. A specific adaptation is to either increase the number of perforations per unit area in the direction of flow or to increase the size of the perforations in the direction of flow, such as from 0.3" to 0.75", the number being the same per unit area. The foregoing measurements as heretofore stated are given by way of example only.

Generally the measurements are such that about 20 to 80 percent, such as about 50 percent of the conveying air will be bypassed. In certain instances it may be advantageous to separate 100 percent of the air before entering chamber 30 (See FIG. 3).

The materials separation chamber 30 comprises a housing 11 having bottom doors 12 conventionally controlled. These doors may comprise conventional doors controlled by means (such as additional auxiliary doors) which prevent open communication of the system with the atmosphere when the doors are opened to remove materials from the system.

The materials separation chamber 30 may have a length of about 3' to 8' such as about 6', a width of 2' to 6' such as about 4', and a depth of about 3' to 8' such as about 6'. A solid plate 13 is positioned within housing 11 above the inlet from inner shell 2 and defines an upper area 14 or passageway and a lower area or storage hopper 15 within housing 11. Preferably no communication exists between upper area 14 and lower area 15 within housing 11. Communication does exist between upper area 14 and area 4 defined between the outer surface of inner shell 2 and the inner surface of outer casing 1. Communication also exist between upper area 14 and down stream outlet duct 25.

A perforated screen 16 is positioned within housing 11 which will permit conveying air to flow therethrough and which is preferably pitched downwardly at its down stream end so as to direct materials downwardly into the storage hopper 15 for removal from the system through doors 12. The separated air flows into outlet duct 25.

A particularly desirable feature is the utilization of the damper 18, or valve control means in upper area 14. This functions as a positive control as to the amount of air by-passed. As pointed out heretofore, when certain of the perforations become clogged, if the volume of air remains the same the velocity through the remainder of the unclogged holes will be proportionately increased thereby aggravating an already undesirable situation.

A further adaptation of the invention is shown in FIG. 3 wherein 100 percent of the conveying air is separated from the materials in pre-separation chamber 20'. In this modification it is preferred that the unperforated outer housing 1' and the perforated inner shell 2' be rectangular in geometric configuration, and that the cross sectional areas of each increase in the direction of flow. It is also preferred that perforations 3 be only in the top panel of inner shell 2'. Thus substantially 100 percent of the conveying air will flow into area 4', through area or passageway 14 into down stream duct 25; the momentum of the conveyed material being sufficient to cause it to enter the hopper area 15. Dampers 18 may be used if desired. There obviously will be no screen element in housing 11 and the conveyed material will be removed from the system through a conventional door arrangement 12 positioned at the bottom of housing 11.

It is to be understood that materials separation chamber 30 may have a plurality of ducts and chambers associated therewith as well as more than one outlet duct (not shown). Other modifications and equivalents are readily apparent.

As can be seen by the above described invention, a predetermined selected portion of the conveying air is released just before reaching the material separation or collecting station so that the remaining conveying air will be insufficient to force and hold the conveyed material against an air separating screen and thereby block the air exit and cause the entire system to be shut down.

The embodiments of the invention in which an exclusive property or privilege is claimed are defined as follows:

1. Apparatus for conveying and collecting sheets of fibrous material from an air stream comprising:
  a. a conveying duct carrying said material;
  b. a pre-selection chamber including an inner perforated conduit connected to said conveying duct, said perforations extending about the circumference of said conduit and an outer casing surrounding said inner conduit to form an annular space for the collection of air;
  c. an exit conduit connected directly between said annular space and the atmosphere for the exhaust of air;
  d. a final separation chamber including a storage bin for the collection of said fibrous material connected to said inner perforated conduit and a perforated screen positioned adjacent to the top of the storage bin, thereby defining an upper space also for the exhaust of air; and
  e. an exit port connected between said upper space and said exit conduit for the independent removal of air from the upper space.

2. Apparatus as claimed in claim 1 wherein a rotatable damper plate is positioned in said exit conduit to reduce the air flow therethrough.

3. Apparatus as claimed in claim 1 wherein at least one door is provided in the storage bin for the removal of said fibrous material.

4. Apparatus as defined in claim 1 wherein the cross sectional area of said outer casing increases in the direction of flow.

5. Apparatus as defined in claim 1 wherein said outer casing is substantially formed in a frustro-conical shape.

* * * * *